(12) United States Patent
Boreyko et al.

(10) Patent No.: US 10,661,908 B2
(45) Date of Patent: May 26, 2020

(54) PASSIVE ANTI-FROSTING SURFACE COMPRISED OF MICROSCOPIC WETTABILITY PATTERNS CONTAINING SACRIFICIAL ICE

(71) Applicants: Jonathan B. Boreyko, Christiansburg, VA (US); Saurabh Nath, Blacksburg, VA (US); Caitlin Bisbano, Blacksburg, VA (US); Grady J. Iliff, Hamilton, VA (US); Ryan Hansen, Manhattan, KS (US); C. Patrick Collier, Oak Ridge, TN (US)

(72) Inventors: Jonathan B. Boreyko, Christiansburg, VA (US); Saurabh Nath, Blacksburg, VA (US); Caitlin Bisbano, Blacksburg, VA (US); Grady J. Iliff, Hamilton, VA (US); Ryan Hansen, Manhattan, KS (US); C. Patrick Collier, Oak Ridge, TN (US)

(73) Assignees: Virginia Tech Intellectual Properties, Inc., Blacksburg, VA (US); UT-Battelle, LLC, Oak Ridge, TN (US)

(*) Notice: Subject to any disclaimer, the term of this patent is extended or adjusted under 35 U.S.C. 154(b) by 280 days.

(21) Appl. No.: 15/724,995

(22) Filed: Oct. 4, 2017

(65) Prior Publication Data
US 2018/0093775 A1    Apr. 5, 2018

Related U.S. Application Data

(60) Provisional application No. 62/403,924, filed on Oct. 4, 2016.

(51) Int. Cl.
| B64D 15/06 | (2006.01) |
| F25B 47/00 | (2006.01) |
| F25C 1/06 | (2006.01) |
| B05D 1/38 | (2006.01) |
| B05D 7/24 | (2006.01) |
| F28F 19/00 | (2006.01) |
| F28F 19/02 | (2006.01) |
| F25D 21/04 | (2006.01) |

(52) U.S. Cl.
CPC ............ B64D 15/06 (2013.01); B05D 1/38 (2013.01); B05D 7/24 (2013.01); F25B 47/006 (2013.01); F25C 1/06 (2013.01); F28F 19/006 (2013.01); F28F 19/02 (2013.01); B05D 2350/33 (2013.01); F25D 21/04 (2013.01); F28F 2245/02 (2013.01)

(58) Field of Classification Search
CPC .......... B64D 15/06; B64D 15/00; B05D 7/24; F25B 47/006
See application file for complete search history.

(56) References Cited

U.S. PATENT DOCUMENTS

2015/0251767 A1* 9/2015 Sapper .................. B64D 15/00
244/134 E

* cited by examiner

*Primary Examiner* — Elizabeth J Martin
(74) *Attorney, Agent, or Firm* — Keith A. Vogt; Keith Vogt, Ltd.

(57) ABSTRACT

A method and device for reducing ice and frost on a surface comprising a wettable pattern on a surface. The pattern is wetted with water which is frozen into ice to create overlapping hygroscopic that cover the surface.

13 Claims, 5 Drawing Sheets

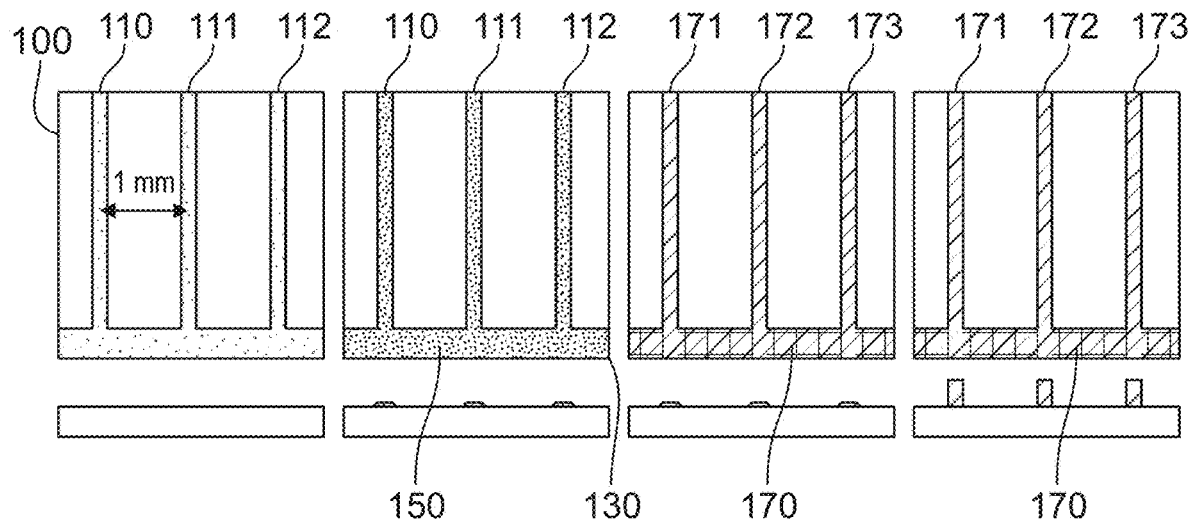
FIG. 1A  FIG. 1B  FIG. 1C  FIG. 1D
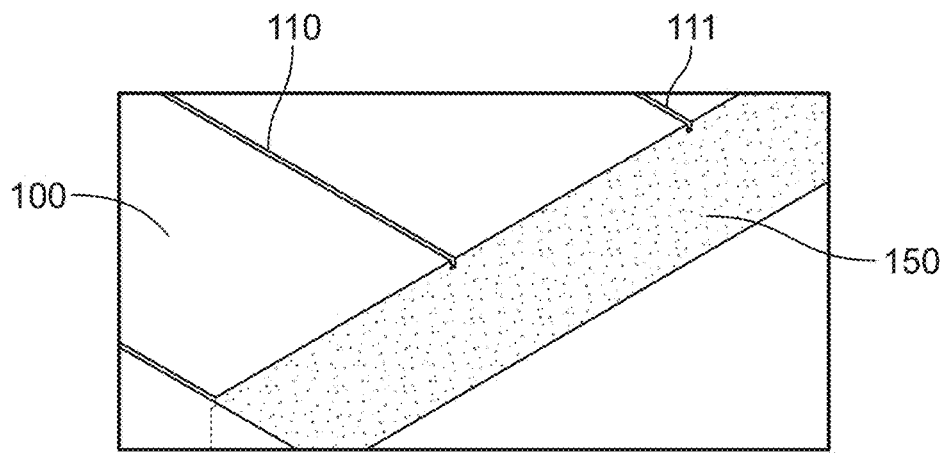
FIG. 2
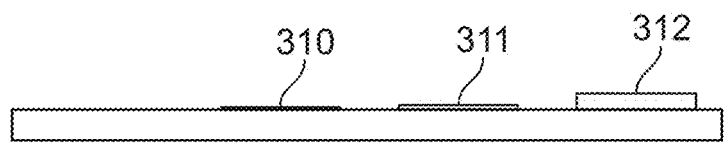
FIG. 3

PASSIVE ANTI-FROSTING SURFACE COMPRISED OF MICROSCOPIC WETTABILITY PATTERNS CONTAINING SACRIFICIAL ICE

RELATED APPLICATIONS

This application claims the benefit of U.S. Provisional Application No. 62/403,924, filed Oct. 4, 2016 and herein incorporated by reference.

STATEMENT REGARDING FEDERALLY SPONSORED RESEARCH & DEVELOPMENT

This invention was made with government support under Contract No. DE-AC05-000R22725 awarded by the U.S. Department of Energy. The government has certain rights in the invention.

INCORPORATION BY REFERENCE OF MATERIAL SUBMITTED ON A COMPACT DISC

Not applicable.

BACKGROUND OF THE INVENTION

Accretion of ice and frost on infrastructure is a multi-billion-dollar problem that adversely affects multiple industries worldwide, including aviation, electrical transmission, hydropower and almost all modes of transportation. For instance, the dynamic characteristics of aircraft flight can be significantly affected by ice accumulating on the airplane wings, resulting in severe damage and even plane crashes.

Frost also accumulates on refrigerators and heat exchangers. It has been found that this may reduce their heat transfer efficiency by as much as 50-75%.

Ice accretion on wind turbines can cause significant reduction in aerodynamic efficiency, with power losses up to 50%.

However, despite unprecedented advances in the fields of surface chemistry and micro/nanofabrication, no engineered surface, to date, has been able to passively suppress the in-plane growth of frost occurring in humid, subfreezing environments.

BRIEF SUMMARY OF THE INVENTION

In one embodiment, the present invention creates an anti-frosting surface which maximizes the dry region where no condensation and frost forms, but would also be cost-effective and environment-friendly.

In another embodiment, the present invention, using ice itself, creates stable dry zones that are free from supercooled condensation and frost even in humid environments. Ice has a depressed vapor pressure relative to supercooled liquid water, which creates a dry zone around ice where no condensation or frost can grow. However, unlike other hygroscopic materials which get increasingly diluted with condensed water, ice is composed solely of water molecules and therefore its low vapor pressure remains stable as it harvests water vapor from the ambient. By spacing microscopic arrays of ice in such a way that the in-plane dry zone about each ice strip overlap, even macroscopically, the surface can remain largely frost-free over time.

In another aspect, the present invention creates microscopic arrays of sacrificial ice by chemical micropatterning to create a wettability pattern that creates arrays of water stripes.

In another aspect, the present invention creates microscopic arrays of sacrificial ice using physical microgrooves. These embodiments may be used in combination or separately.

In other embodiments, the present invention provides a wettability pattern that creates arrays of water strips.

In other embodiments, the present invention provides a wettability pattern that creates arrays of water stripes. The water stripes can subsequently be frozen by chilling beneath 0° C., by electrofreezing or by contact with an external piece of ice. The ice stripes serve as intermittent humidity sinks on the substrate creating overlapping dry zones that keep the surface frost-free.

In another embodiment, the present invention provides a passive anti-frosting surface technology, where chilled substrate stays dry from dew and frost under highly supersaturated conditions.

In other embodiments, the present invention comprises an array of small metallic fins that run along the surface, where the top edges of the fins are roughened to enable preferential wicking of water 'stripes' along each fin.

In other aspects, the embodiments of the present invention prevent condensation and frost from forming elsewhere on the surface. The enabling mechanism is the depressed (hygroscopic) saturation vapor pressure of ice compared to supercooled liquid water at the same temperature such that the embodiments act as humidity sinks that may be overlapping, and function to siphon nearby moisture from the air.

In other embodiments, the present invention provides sacrificial ice stripes that may grow over time on the surface in the out-of-plane direction.

In other embodiments, the present invention provides methods that passively suppress frost indefinitely on a chilled surface under supersaturated conditions.

In other embodiments, the present invention provides passive-anti frosting methods that keep a surface predominantly dry from condensation and frost without requiring the active input of chemicals, heat, mechanical forces, wind, or electricity.

The embodiments of the present invention provide methods and devices that exploit the hygroscopic nature of ice for anti-frosting applications itself. The fact that ice itself has hygroscopic properties that can be tapped into for anti-frosting itself.

In certain aspects, the embodiments of the present invention utilize dilute arrays of hygroscopic ice stripes to mitigate the use of salts and other harmful chemicals by the fact that: (1) ice is environmentally benign, and (2) as ice harvests water vapor it remains pure ice, so it is the only hygroscopic material that does not degrade over time.

In certain aspects, the embodiments of the present invention provide a method of reducing ice and frost on a surface comprising the steps of: providing a pattern of channels on said surface; filling said channels with water; freezing said water in said channels to form ice in said channels; said ice in said channels creates overlapping hygroscopic zones; and said hygroscopic zones overlap to cover the entire surface of said substrate.

BRIEF DESCRIPTION OF THE SEVERAL VIEWS OF THE DRAWINGS

In the drawings, which are not necessarily drawn to scale, like numerals may describe substantially similar components throughout the several views. Like numerals having different letter suffixes may represent different instances of substantially similar components. The drawings illustrate generally, by way of example, but not by way of limitation, a detailed description of certain embodiments discussed in the present document.

FIG. 1A is a top-down and side-view of a microscopic pattern of interconnected hydrophilic stripes for an embodiment of the present invention.

FIG. 1B is a top-down and side-view of the embodiment shown in FIG. 1A that has been wetted with water.

FIG. 1C is a top-down and side-view of the embodiment shown in FIG. 1B where the water has subsequently frozen into ice.

FIG. 1D is a top-down and side-view of the embodiment shown in FIG. 1C showing that the entire surface area between the ice stripes remain substantially dry from condensation and frost when the spacing between stripes is less than twice the value of a single dry zone for an embodiment of the present invention.

FIG. 2 is an isometric view of the microgrooves connected to the water reservoir which would fill the grooves to enable the freezing of the stripes together by forming contact with an external ice for an embodiment of the present invention.

FIG. 3 shows a side view of the elevated microgrooves, some being flush with the surface and some as high as 1 mm in height for an embodiment of the present invention.

DETAILED DESCRIPTION OF THE INVENTION

Figure 4:
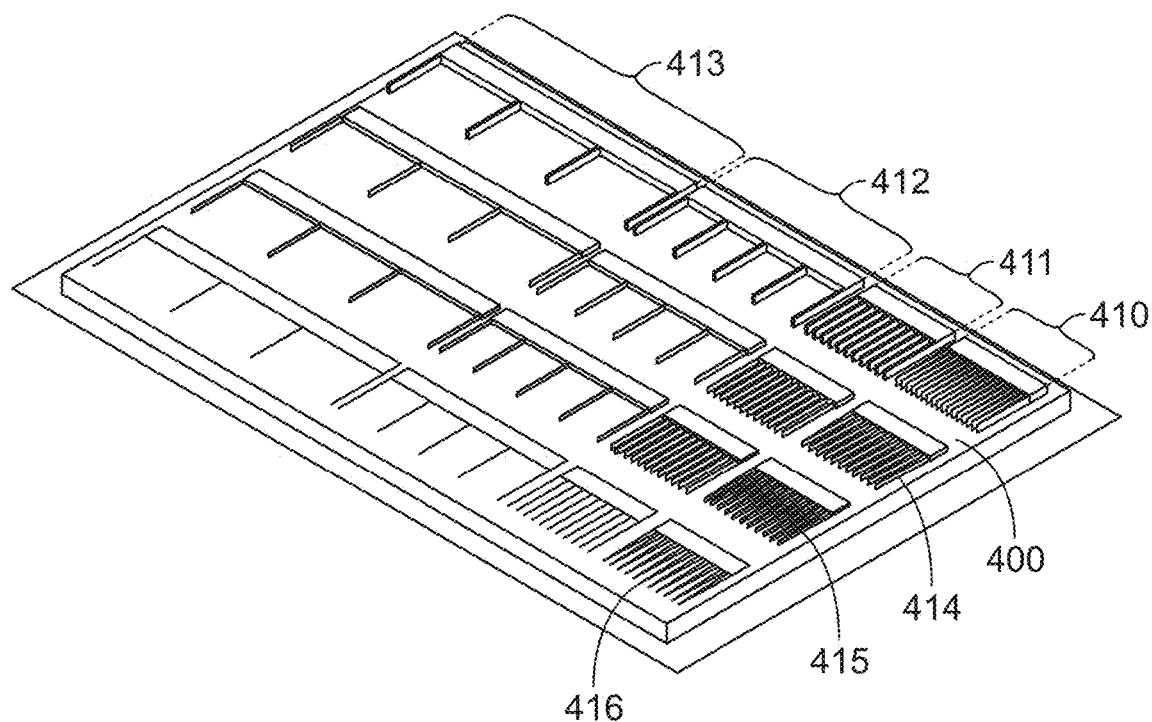
FIG. 4 is an isometric view of the entire aluminum plate with microgrooves of different elevations and inter-stripe distances for an embodiment of the present invention.

Detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a representative basis for teaching one skilled in the art to variously employ the present invention in virtually any appropriately detailed method, structure or system. Further, the terms and phrases used herein are not intended to be limiting, but rather to provide an understandable description of the invention.

As shown in FIGS. 1A and 2, in one embodiment, the present invention may utilize photolithography to pattern in substrate 100 arrays of microscopic hydrophilic (bare silicon oxide) stripes 110-112 onto a hydrophobic (silane monolayer) backdrop. The pattern may also be exposed to an oxygen plasma to restore the full hydrophilicity of the silicon oxide features, followed by a dry peel-off of the patterned parylene coating that was protecting the hydrophobic monolayer. The hydrophilic stripes may have a width of around 10-15 μm and may be connected to a long hydrophilic water pad 130 at the edge of the substrate as shown which holds water 150 as shown in FIG. 1B.

The water pad 150 serves two purposes: a) it can be used to deposit a water drop which would then spread onto the hydrophilic stripes and b) when the water pad is frozen by touching it with a piece of ice it would also freeze all the water stripes together at the same time. Another possible way of obtaining ice stripes is to cool the substrate below the dew point so that condensation fills the hydrophilic stripes. Freezing may also be induced in multiple ways for the supercooled water pattern: by touching with ice, electrofreezing, or by spontaneous heterogeneous ice nucleation.

As shown in FIGS. 1A-1D, a microscopic pattern of interconnected hydrophilic stripes or channels 110-112 are wetted with water 150 and subsequently frozen into ice 170. The entire surface area between the ice stripes 171-173 should remain dry from condensation and frost when the spacing between stripes is less than twice the value of a single dry zone.

Physical microgrooves patterns are known to be more robust, durable, easy to fabricate and less expensive than chemical microfabrication and can be done in a number of other ways such as 3D printing, molding, etc. The distance between two microgrooves is varied with the maximum being 1 mm. These grooves are 15 μm in width and 25 μm in depth and are connected to a water reservoir. Some of these grooves are flush with the dry zone surface while others may be elevated off the ground by different heights ranging from 100 μm to 1 mm. Elevating the microgrooves off the ground serves several purposes. First, elevating the microgrooves off the ground assists in preventing the ice stripes from growing in-plane over the dry regions. Also, elevating assists in pushing the boundary layer thickness higher, which in turn, serves to increase the dry zone length about each ice stripe.

As shown in FIG. 3, elevated microgrooves 310-312, some being flush with the surface (310) and some as high as 1 mm in height (312). It is expected that the taller the pillars are with the frost on top, the more pronounced would be the effect of dry zone.

In an alternate embodiment, as shown in FIG. 4, a substrate 400 is provided which may be an aluminum plate. For this embodiment of the present invention, a plurality of microgroove sets 410-416 in the form of linear arrays of channels is provided. The channels may have different elevations and varying inter-stripe, channel, or groove distances.

Figure 5:
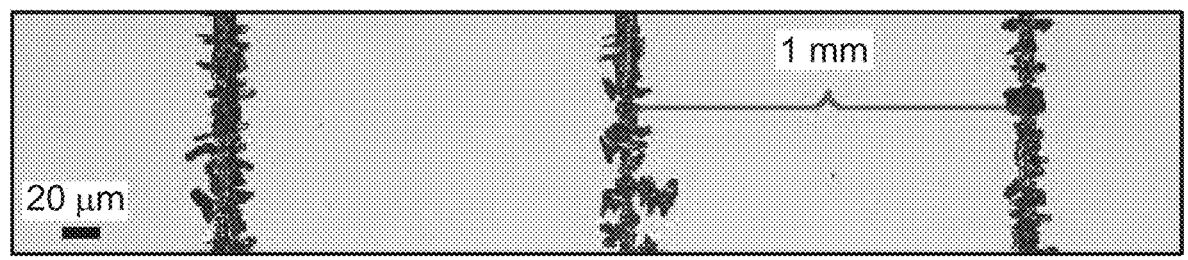
FIG. 5 depicts frozen 10 μm water stripes with 1 mm inter-stripe distances for an embodiment of the present invention.

FIG. 5 depicts frozen 15 μm water stripes with 1 mm inter-stripe distances for an embodiment of the present invention. The ice stripes keep the intermittent distances dry because of overlapping dry zones. Experiment shows near 90% dry surface with no frost or condensation at around $T=-8°$ C. and a supersaturation $S=1.2$.

In a preferred method, the nucleation energy barrier for condensation is lower for microgrooves than for flat surfaces which causes preferential condensation in the grooves. An alternative way for doing the same is by filling the water reservoir connected to the grooves with water. The next step is to freeze the water stripes all at the same time. This creates parallel arrays of ice stripes than can have overlapping dry zones that keep the surface macroscopically frost free.

Figure 6A:
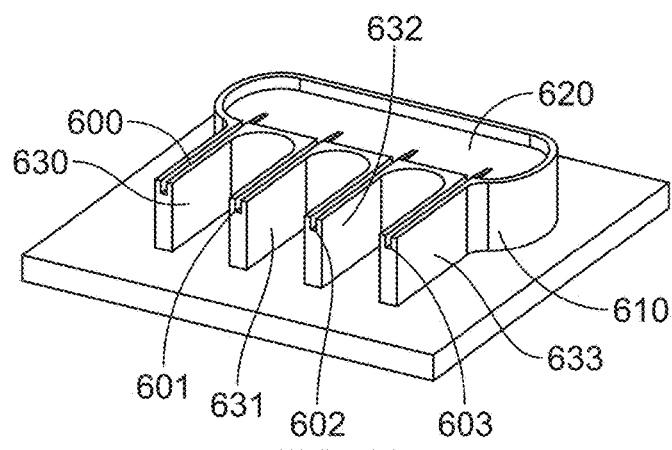
FIG. 6A shows micro-grooves along the top of each fin for an embodiment of the present invention.
Figure 6B:
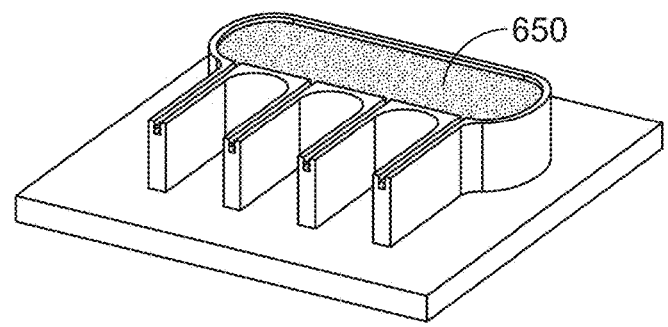
FIG. 6B shows how water preferentially wicks along the tops of the fins.
Figure 6C:
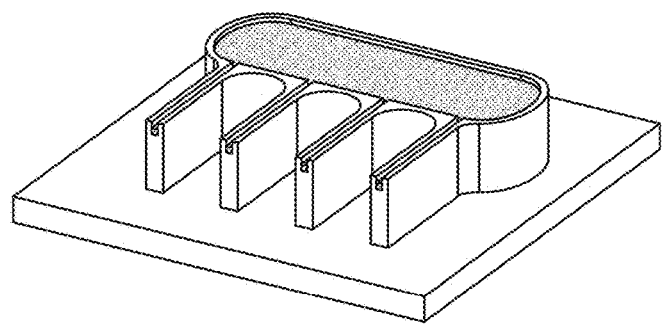
FIG. 6C shows how water freezes into ice.
Figure 6D:
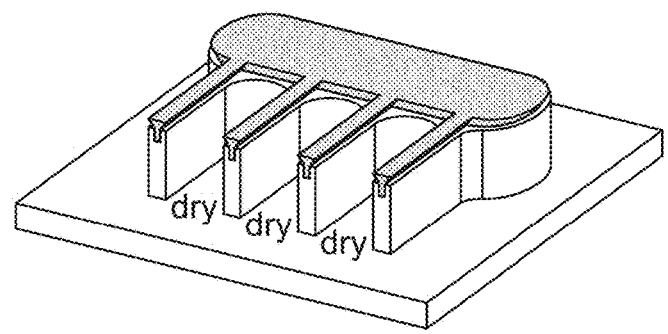
FIG. 6D shows the hygroscopic ice stripes siphoning water vapor, keeping the rest of the finned surface dry from condensation and frost.

A sample was put on a Peltier stage and placed inside a humidity chamber. In order to obtain microscopic arrays of ice on the hydrophilic regions, the temperature of the substrate was brought down to $-10°$ C. Once supercooled condensation completely wetted the hydrophilic stripes, the temperature was sharply brought down to $-30°$ C. Approximately 5s later, all the hydrophilic stripes were frozen. The stage was brought to around $-8°$ C., and the humidity was set to 21%. Corresponding to air temperature of $16.6°$ C., the supersaturation was $S=p\infty/pw=1.2$, where $P\infty$ is the vapor pressure in the ambient and Pw is the saturation vapor pressure corresponding to the substrate temperature. The fact that $S>1$ implies that the substrate temperature was significantly below that the dew point and hence the surface should exhibit condensation and subsequent freezing. However, the entire sample barring the sacrificial ice stripes was observed to be frost free for 12 mins. The hydrophilic stripes were ~20 μm in width, while the edge to edge separation between two ice stripes was 1 mm. This implies that despite being in a subfreezing humid environment close to 90% of the substrate was completely dry without any observable condensation or frost whatsoever FIGS. 6A-6D shown an alternate embodiment of the present invention. For this embodiment, microgrooves 600-603 may be machined into substrate 610. Reservoir 620 is also provided. By machining micro-grooves along the top of each fin 630-633, water preferentially wicks along the tops of the fins. Upon freezing into ice 650 in chilled conditions, these hygroscopic ice stripes siphon all nearby water vapor, keeping the rest of the finned surface completely dry from condensation and frost as shown in FIGS. 6C and 6D.

In other embodiments, the fins may have the same height and be equally spaced apart or be not equally spaced apart. In other embodiments, the fins may have varying heights and be equally spaced apart or be not equally spaced apart. The fins may also be arranged in linear arrays.

Figure 7A:
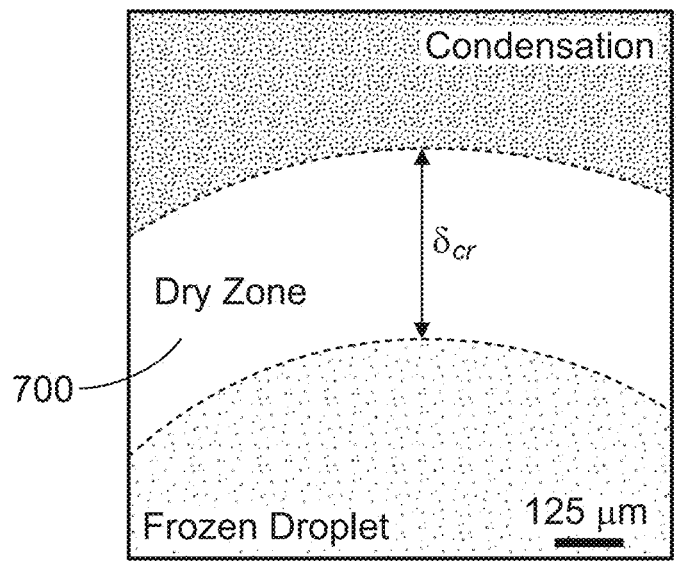
FIG. 7A is a micrograph of how a millimetric frozen droplet creates a dry zone around itself on a substrate kept at Tw=−12.5° C., air temperature being T∞=17.4° C. and humidity RH=21%.
Figure 7B:
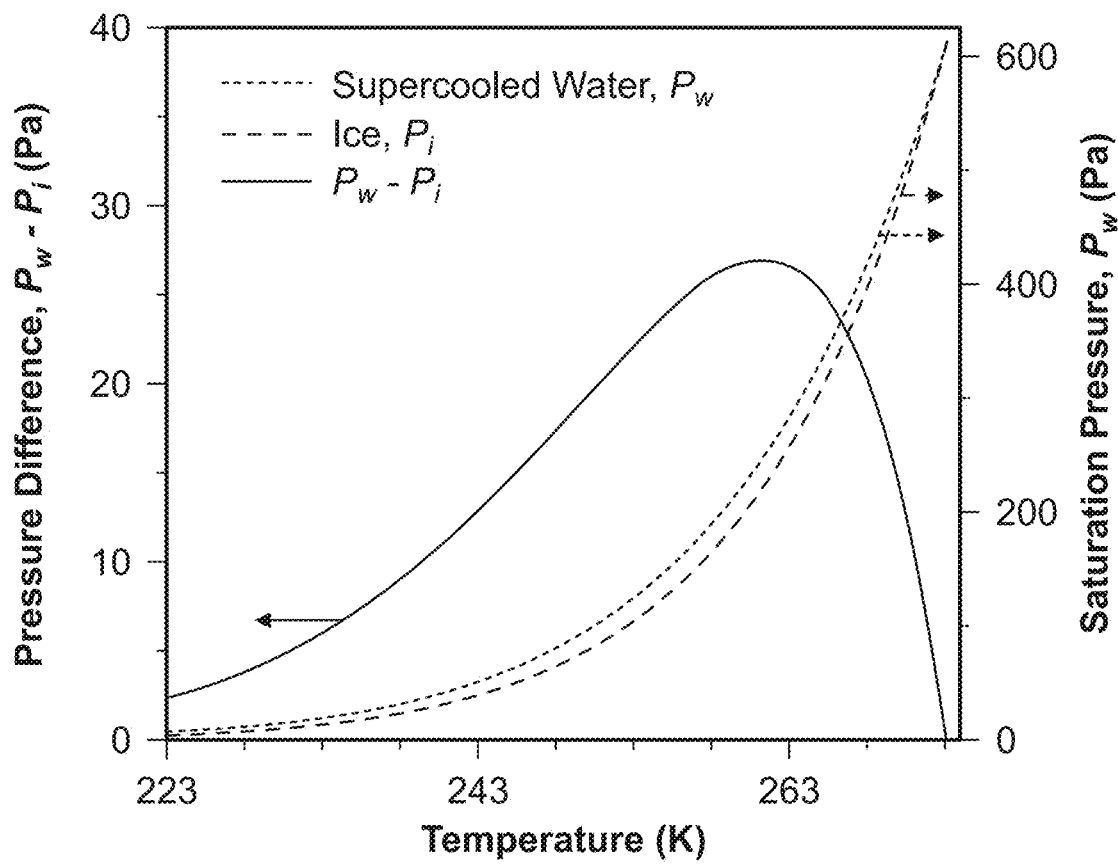
FIG. 7B shows a saturation vapor pressure of water and ice plotted against temperature. The saturation vapor pressure difference peaks at T=−12.5° C. It is this vapor pressure difference that causes ice to behave as a humidity sink, creating the dry zone.

The embodiments of the present invention follow directly from the discovery that ice can evaporate liquid water droplets around itself, creating a dry zone 700, where no condensation or frost can grow as shown FIG. 7A. The underlying mechanism is that the saturation vapor pressure of ice is lower than that of water at the same subzero temperature, causing ice to behave as a humidity sink as shown in FIG. 7B.

Figure 8A:
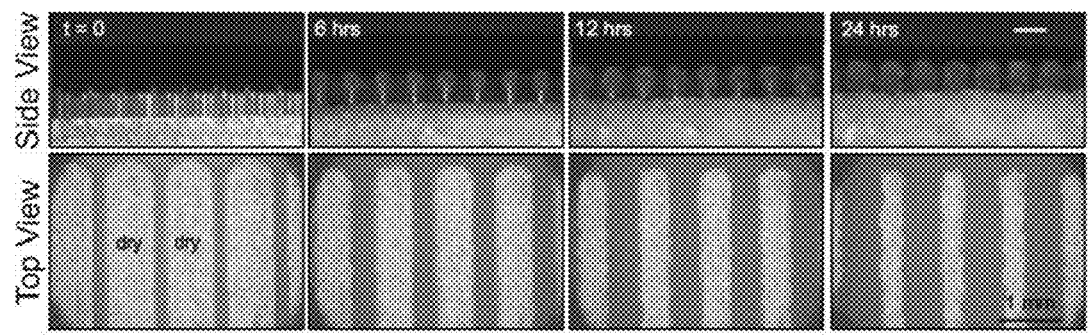
FIG. 8A depicts sacrificial fin tops on an aluminum surface with the fins acting to keep the aluminum surface completely dry from condensation and frost even after 24 hours of exposure to supersaturated conditions for an embodiment of the present invention.
Figure 8B:
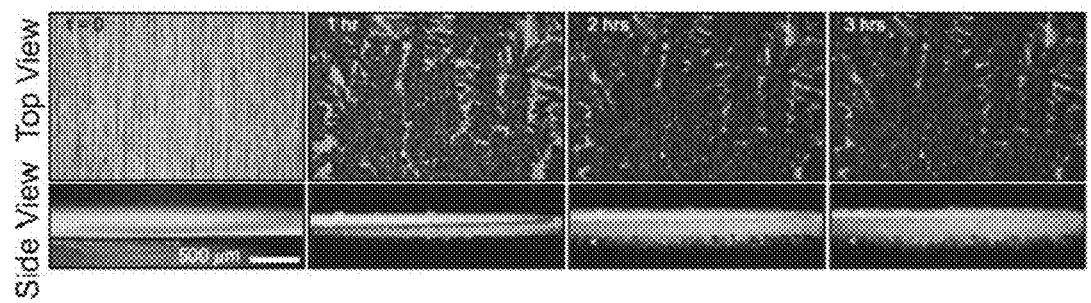
FIG. 8B shows how a smooth aluminum surface is completely frosted over in under 1 hour under the identical environmental conditions.

FIG. 8A depicts sacrificial fin tops on an aluminum surface staying completely dry from condensation and frost even after 24 hr of exposure to supersaturated conditions for an embodiment of the present invention. FIG. 8B shows a smooth aluminum surface is completely frosted over in under 1 hr under the identical environmental conditions.

Figure 8C:
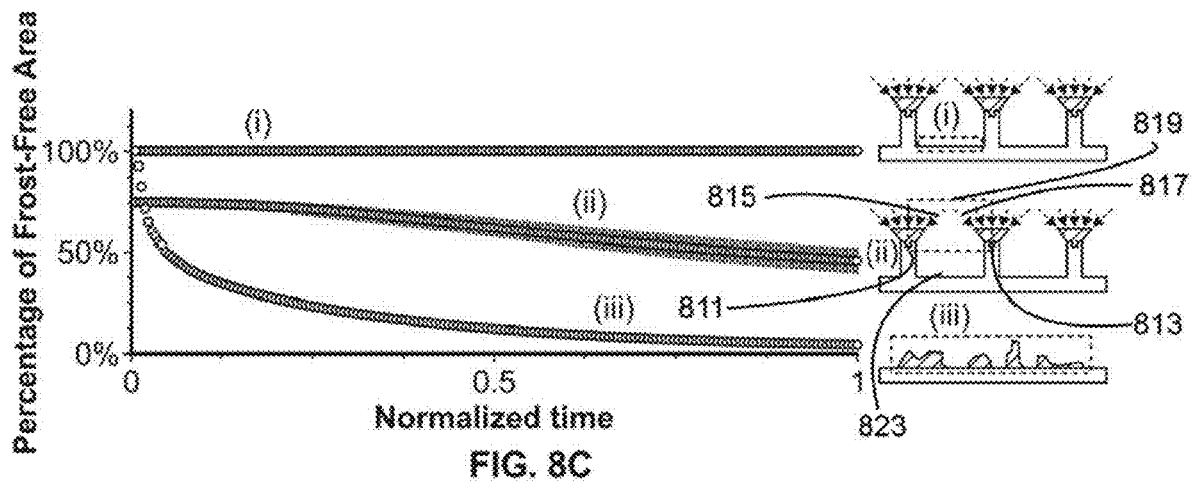
FIG. 8C is a plot of frost-free area over time for regular aluminum surface (iii) and an embodiment of the present invention (i) and (ii). The data points of (i) correspond to flat bare aluminum surface between the ridges, which is a critical region of interest, as shown in (i). Note that this part of the surface develops no frost whatsoever since the data points are constant at 100%. The (ii) data points correspond to the top-down projected area including the ridges. The decreasing nature of the (ii) data points is because the frost atop of the ridges coarsen over time. However, this frost could not reach the aluminum floors at the bottom between the ridges, that is, region (i) at any point of time.

FIG. 8C is a plot of frost-free area over time for regular aluminum surface (iii) and an embodiment of the present invention (i) and (ii). The data points of (i) correspond to flat bare aluminum surface between the ridges, which is a critical region of interest, as shown in (i). Note that this part of the surface develops no frost whatsoever since the data points are constant at 100%. The (ii) data points correspond to the top-down projected area including the ridges. The decreasing nature of the (ii) data points is because the frost atop of the ridges coarsen over time. However, this frost could not reach the aluminum floors at the bottom between the ridges, that is, region (i) at any point of time because ice 811 and 813 create hygroscopic zones 815 and 817 that form overlap 819 to reduce ice formation on substrate 823.

In yet other embodiments of the present invention, micro-milling was employed to create an array of fins on an aluminum substrate that were 1 mm tall, about 200 μm wide, and spaced 1 mm apart from each other. Subsequently, 15 μm micro-grooves were cut into the middle of the top of each fin. By having all these grooves feed into a connecting mini reservoir, the array of water stripes could be easily produced by simply filling the reservoir with water. The surface was then chilled down to $Tw=-10+/-1°$ C. on a Peltier stage to freeze the water into ice stripes, and the resulting anti-frosting behavior in a humid environmental chamber was observed using top-down and side-view microscopes. The air was both warm ($T\infty=17+/-1°$ C.) and humid: both 30% and 16% relative humidities were tried, which corresponds to supersaturations of 1.5 and 1.1, respectively, relative to the saturation pressure of the $Tw=-10+/-1°$ C. surface. It was observed that no matter how much time elapsed, all of the frost growth occurred solely atop the ice stripes, leaving the rest of the substrate completely dry from both supercooled condensation and frost.

While the foregoing written description enables one of ordinary skill to make and use what is considered presently to be the best mode thereof, those of ordinary skill will understand and appreciate the existence of variations, combinations, and equivalents of the specific embodiment, method, and examples herein. The disclosure should therefore not be limited by the above described embodiments, methods, and examples, but by all embodiments and methods within the scope and spirit of the disclosure.

What is claimed is:

1. A method of reducing ice and frost on a surface comprising the steps of:
   providing a wettable pattern on said surface;
   wetting said pattern with water;
   freezing said water to form ice on said pattern;
   said ice on said pattern creates overlapping hygroscopic zones;
   said hygroscopic zones overlap to cover the surface of said substrate; and
   wherein said wettable pattern is in fluid communication with a water reservoir.

2. The method of claim 1 wherein said hygroscopic zones are in-plane and said spacing between said wettable pattern is less than twice the value of a hygroscopic zone.

3. The method of claim 2 wherein said hygroscopic zones keep siphoning nearby water vapor, keeping the rest of the surface dry from condensation and frost.

4. The method of claim 1 wherein said wettable pattern is a pattern of stripes, said stripes are spaced apart, said spacing between stripes is less than twice the value of a hygroscopic zone.

5. The method of claim 4 wherein said stripes are grooves located on the top side of fins extending from said surface.

6. The method of claim 5 wherein said fins have the same height.

7. The method of claim 6 wherein said fins are equally spaced apart.

8. The method of claim 6 wherein said fins are not equally spaced apart.

9. The method of claim 5 wherein said fins are of varying heights.

10. The method of claim 9 wherein said fins are equally spaced apart.

11. The method of claim 9 wherein said fins are not equally spaced apart.

12. The method of claim 1 wherein ice is formed by cooling said surface.

13. The method of claim 1 wherein said ice is formed by freezing said water in said water reservoir.

* * * * *